2,708,204

HALOGEN- AND PHOSPHORUS-CONTAINING COMPOUNDS

Edward R. Bell, Concord, and Roy E. Thorpe, San Francisco, Calif., assignors to Shell Development Company, San Francisco, Calif., a corporation of Delaware No Drawing. Application August 11, 1950, Serial No. 179,004

11 Claims. (Cl. 260—429)

This invention relates to novel organo phosphorus compounds and to a method for their preparation. More particularly, the invention relates to novel monobasic halogen-substituted aliphatic organic phosphonic acids and to new and useful salts of such phosphonic acids, and to a method for the preparation of the novel products.

An object of the present invention is new and useful phosphonic acids. A more particular object is monobasic phosphonic acids having directly linked to the phosphorus atom of the phosphono group an aliphatic radical that bears a plurality of atoms of halogen directly linked to the alpha carbon atom. Salts of the novel halogen-substituted aliphatic monobasic phosphonic acids, especially with polyvalent hydroxide-forming metals, form another object of the invention. The novel compounds as new and useful agents which, upon addition to lubricants of the petroleum type and also those of the synthetic variety, improve the characteristics of the lubricants, and the novel lubricant compositions, are further objects of the invention. A practical method for the production of the novel compounds of the invention forms another object. Other objects will appear hereinafter.

The products that are provided by the present invention are certain monobasic phosphonic acids that have a halogen-substituted aliphatic radical directly linked by a carbon-to-phosphorus bond to the phosphorus atom of a mono-esterified phosphono group, and the salts of these mono-basic acids. The preferred compounds of the invention are those monobasic phosphonic acids in which the alpha carbon atom of the halogen-substituted aliphatic radical bears a plurality of halogen atoms, especially a plurality of chlorine atoms. In the mono-esterified phosphono group the esterifying radical can be the radical of any alcohol. Preferably, however, the esterifying radical is the radical of an aliphatic monohydric alcohol, such as a lower saturated or a lower olefinically unsaturated alcohol. The halogen-substituted aliphatic radical that is directly linked to the phosphorus atom preferably is a halogen-substituted aliphatic hydrocarbon radical bearing a plurality of atoms of halogen.

The new phosphonic acids are prepared in accordance with the process of the invention by a novel transesterification reaction between a dibasic phosphonic acid having a halogen-substituted aliphatic radical directly linked by a carbon-to-phosphorus bond to the phosphorus atom of the phosphono group with a diester of said phosphonic acid. Any diester of the phosphonic acid may be used, subject to the proviso that the diester shall contain at least one esterifying alcohol radical that is the same as the esterifying alcohol radical in the product it is desired to produce. The phosphonic acids that are employed in this process of the invention can, in certain cases, be prepared, for example, by oxidation of a suitable primary phosphine. We have found, however, that when the dibasic phosphonic acid is one in which the halogen-substituted aliphatic radical directly attached by a carbon-to-phosphorus bond to the phosphorus atom of the phosphono group is multi-substituted by halogen on the carbon atom next to the phosphorus atom, the acid is best prepared by pyrolyzing a dialkyl ester thereof, preferably a di-n-alkyl or a di-sec.-alkyl ester, by heating at about 160° C. to about 225° C. in the liquid phase while withdrawing evolved gas. The dibasic phosphonic acid prepared by this or other applicable method then is employed in the novel transesterification reaction with the selected neutral phosphonate.

The reaction leading to the new phosphonic acids is illustrated by Equation b below, which represents the preparation of butyl trichloromethanephosphonic acid from dibutyl trichloromethanephosphonate and trichloromethanephosphonic acid. The latter reactant can be prepared by pyrolyzing dibutyl trichloromethanephosphonate (Equation a).

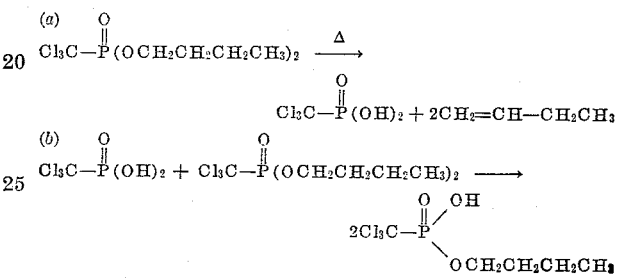

The novel phosphonic acids of the invention may be described by the formula

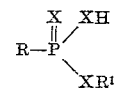

in which R represents a halogen-substituted aliphatic radical, R preferably being a haloalkane radical having a plurality of halogen atoms substituted upon the carbon atom next to the phosphorus atom, $R^1$ represents the esterifying radical derived from any alcohol $R^1OH$, and each X is a divalent atom of a non-metallic element of group VI-B of the periodic table of the elements. In the preferred compounds $R^1$ represents the esterifying radicals of a lower saturated acyclic alcohol or a lower unsaturated acyclic alcohol, and in the particularly preferred phosphonic acids R represents the trichloromethyl (—CCl₃) radical. A specifically preferred group of compounds is represented by the formula

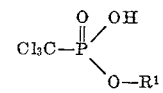

when $R^1$ represents the esterifying radical of an alcohol.

Illustrative monobasic phosphonic acids of the present generic invention include among others the following:

Butyl 3-bromopropanephosphonic acid:

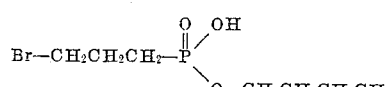

Ethyl 2,3-dibromopropanephosphonic acid:

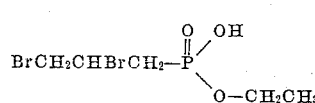

Isopropyl 1,3,5-trichlorohexanephosphonic acid:

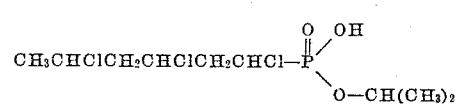

Cyanoethyl 1,1,4-tribromobutanephosphonic acid:

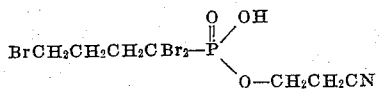

Methoxyethyl 1-bromopropane-2-phosphonic acid:

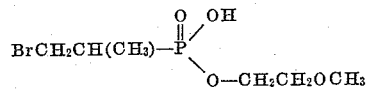

3-thiocyanopropyl 1,1,3-trichlorobutanephosphonic acid:

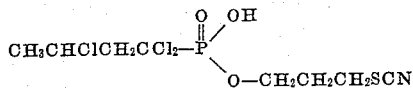

Allyl 1,1-dichloroethanephosphonic acid:

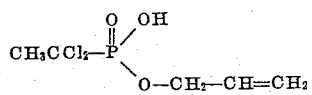

Hexyl 1,1-dichloroethanephosphonic acid:

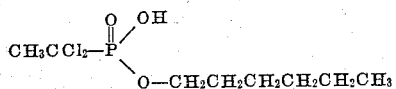

Butyl 3-bromo-2-propene-1-phosphonic acid:

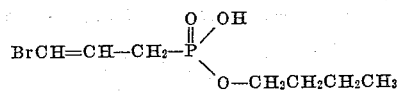

Cyclohexyl 3-bromo-2-fluoropropanephosphonic acid:

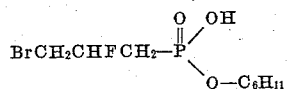

s-Butyl fluoromethanephosphonic acid:

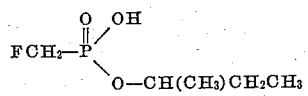

Allyl tri-2-fluoro-1-chloroethanephosphonic acid:

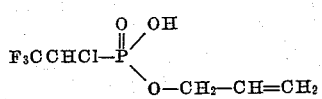

Ethyl 1,1,3-trichlorononanephosphonic acid:

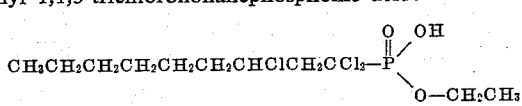

Butyl iodomethanephosphonic acid:

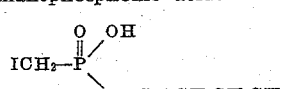

Butyl 3-bromopropanephosphonic acid:

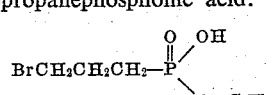

Isobutyl 2-(chloromethyl)propane-2-phosphonic acid:

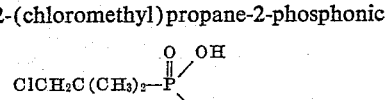

2-carbomethoxyethyl 2,3-dichloropropanephosphonic acid:

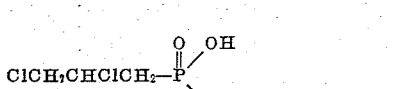

Butyl trichloromethanetrithiophosphonic acid:

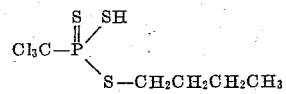

Butyl tribromomethanethionophosphonic acid:

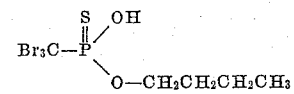

Allyl 1,1,2-trichloroethanedithiolophosphonic acid:

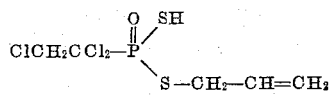

Butyl trichloromethanetriselenophosphonic acid:

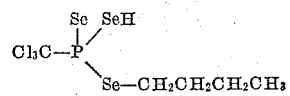

One of the important uses of the novel compounds of the present invention is as additives to improve the properties of lubricants of various types, especially the ability of such lubricants to maintain effective lubrication under conditions of extreme pressure, approaching seizure, upon the oily film. The experimental evidence has led to the conclusions that within the class of compounds of the invention utility as extreme-pressure additives is markedly favored by (a) the presence of a trihalomethyl radical (e. g., Cl₃C—) in the halo-substituted aliphatic hydrocarbon radical that is directly bonded to the phosphorus atom, and (b) the presence of a plurality of halogen atoms on said halogen-substituted hydrocarbon radical and close proximity of such halogen atoms to the phosphorus atom. The preferred phosphonic acids of the invention, which are especially well adapted to this use, either (a) contain a trihalomethyl radical as or in the halogen-substituted hydrocarbon radical that is directly bonded to the phosphorus atom, or (b) contain at least two atoms of halogen substituted on carbon atoms not more than three carbon atoms removed from the phosphorus atom. The acids of preferred group (b) thus conform to the structural formula

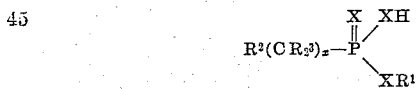

in which $R^2$ is hydrogen, alkyl, or halogen-substituted alkyl, each $R^3$ is hydrogen, alkyl, halogen-substituted alkyl, or halogen, each $R^3$ being considered independently of its other occurrences but at least two $R^3$'s representing halogen, preferably chlorine, $x$ is a whole positive number from 1 to 4, inclusive, $R^1$ is the esterifying alcohol radical, and X is a non-metallic element of group VI–B of the periodic table of the elements. Particularly effective as extreme pressure additives are the phosphonic acids represented by the above formula when the carbon atom that is directly bonded to the phosphorus atom is substituted by at least two atoms of chlorine, and the esterifying radical represented by $R^1$ is the radical of an acyclic monohydric alcohol. The phosphonic acids that conform to the formula

in which Hal represents halogen, preferably chlorine, X represents sulfur or oxygen, and R is the radical of an alcohol, preferably an acyclic monohydric alcohol, combine the desirable attributes of (a) the presence of a trihalomethyl radical (e. g., Cl₃C—) and (b) a plurality of halogen atoms substituted on the aliphatic hydrocarbon radical that is bonded to the phosphorus atom, in close proximity to the phosphorus atom, and are particularly outstanding as improved extreme pressure additives.

Illustrative of the particularly preferred monobasic trihalomethane phosphonic acids provided by the invention are among others the following:

n-Butyl trichloromethanephosphonic acid
Ethyl trichloromethanephosphonic acid
n-Propyl trichloromethanephosphonic acid
Methyl trichloromethanephosphonic acid
Isopropyl trichloromethanephosphonic acid
n-Hexyl trichloromethanephosphonic acid
Isoamyl trichloromenthanephosphonic acid
Octyl trichloromethanephosphonic acid
Decyl trichloromethanephosphonic acid
Chlorophenyl trichloromethanephosphonic acid
Dodecyl trichloromethanephosphonic acid
Tetradecyl trichloromethanephosphonic acid
Hexadecyl trichloromethanephosphonic acid
Octadecyl trichloromethanephosphonic acid
Allyl trichloromethanephosphonic acid
Methallyl trichloromethanephosphonic acid
Crotyl trichloromethanephosphonic acid
Cinnamyl trichloromethanephosphonic acid
Propargyl trichloromethanephosphonic acid
3-chloroallyl trichloromethanephosphonic acid
Oleyl trichloromethanephosphonic acid
Cyclohexenyl trichloromethanephosphonic acid
3-amylmercaptopropyl trichloromethanephosphonic acid
3-ethoxypropyl trichloromethanephosphonic acid
Benzyl trichloromethanephosphonic acid
Bis(chloromethyl)methyl trichloromethanephosphonic acid
3-hydroxypropyl trichloromethanephosphonic acid
Ethylene bis(trichloromethanephosphonic) acid
3-aminopropyl tribromomethanephosphonic acid
Cyclohexyl trichloromethanephosphonic acid
2-chloroallyl trichloromethanephosphonic acid
Butyl dibromochloromethanephosphonic acid
Isoamyl trifluoromethanephosphonic acid
Ethyl triiodomethanephosphonic acid
n-Butyl fluorodichloromethanephosphonic acid The monobasic halogen-substituted aliphatic phosphonic acids of the present invention are strong acids and as such they are capable of forming valuable salts with a wide variety of basic materials. The present generic invention includes all such salts of the foregoing named and analogous and homologous halogen-substituted monobasic phosphonic acids. Of particular interest are the salts of the novel phosphonic acids in which the cationic radical or ion is an atom or ion of a polyvalent, hydroxide-forming metal, such as the iron, cobalt, nickel, copper, magnesium, calcium, zinc, chromium, cadmium, mercury, manganese, barium, aluminum, lead, and bismuth salts. The alkali metal salts, including the lithium, sodium, potassium, rubidium, and cesium salts of the novel phosphonic acids, are also included by the generic invention.

As indicated hereinbefore, the method of the invention comprises a novel transesterification reaction between a dibasic halo-substituted aliphatic phosphonic acid and a diester of preferably the same halo-substituted aliphatic phosphonic acid to directly produce the new phosphonic acids of the invention. The reaction can be effected by heating a mixture of the dibasic phosphonic acid and the diester of a phosphonic acid at elevated temperatures, in the presence of esterification catalysts if desired. Temperatures of from about 35° C. to about 200° C. can be employed, a preferred range being from about 50° C. to about 135° C. The ratio between the amount of the diester and of the dibasic acid initially present in the mixture can be varied, say from about 1:10 to 10:1, expressed on a mole basis. Substantially equimolar proportions are preferred. The reaction can be conducted in the presence of inert solvents, if desired, such as a petroleum solvent, e. g., petroleum ether, a ketone solvent, e. g., cyclohexanone, or dioctyl ketone, an ether, such as diisoamyl ether of dioxane, or the like. Superatmospheric pressures can be employed. The reaction between the dibasic phosphonic acid and the diester can be carried out either in a batchwise manner or, especially in larger scale operations, by a continuous process.

The reaction between the dibasic phosphonic acid and the diester appears to be one that leads to the formation of an equilibrium mixture comprising the desired monobasic phosphonic acid and the selected reactants. The time required in any specific case for attainment of the equilibrium depends upon whether or not catalysts are used, upon the specific reactants that are involved and upon the reaction temperature. In general, reaction times of from about 1 hour to 150 or more hours are used. As the reaction progresses, the content of strong acid in the reaction mixture increases. The extent of the reaction can be estimated and followed by titration of aliquots of the reaction mixture. Yields of the monobasic halogen-substituted aliphatic phosphonic acid as high as 90% based on the amounts of the reactants consumed, can be attained. By intermittently or continuously removing the monobasic halogen-substituted aliphatic phosphonic acid from the mixture, and recycling unconsumed reactants, equally high conversions of the reactants to desired product are realized.

The desired monobasic phosphonic acid can be recovered from the reaction mixture by any suitable method, including, without being limited to, extraction of the mixture with selective solvents, fractional distillation, and crystallization from solvents.

It will be appreciated that the desired monobasic phosphonic acid can be prepared directly by reaction between the corresponding halogen-substituted dibasic phosphonic acid and the diester of the selected alcohol with the dibasic phosphonic acid, or that in some cases an indirect procedure can be utilized. For example, 2,3-dichloropropyl trichloromethanephosphonic acid could be prepared directly by reaction between trichloromethanephosphonic acid and bis-(2,3-dichloropropyl) trichloromethanephosphonate, or it could be prepared by first reacting in the above-described manner trichloromethanephosphonic acid with diallyl trichloromethanephosphonate to produce allyl trichloromethanephosphonic acid separating out this product, and then chlorinating it to obtain the desired 2,3-dichloropropyl trichloromethanephosphonic acid. In other cases, the phosphonic acids of the invention in which the esterifying radical is halogen-substituted could be prepared by substitutive halogenation of corresponding phosphonic acids in which the esterifying alcohol radical is the radical of a saturated unsubstituted alcohol. The choice between the direct and the indirect methods will ordinarily depend upon whether reactive groups which could interfere with the transesterification reaction are present in the alcohol radical of the phosphonic acid diester, upon the availability of the phosphonic acid diester required for direct production of the desired monobasic phosphonic acid, and upon similar considerations.

Salts of the monobasic phosphonic acids with mineral bases can be prepared by heating the halogen-substituted aliphatic monobasic phosphonic acid with the selected base, preferably in the presence of water or other suitable solvent, or by metathesis between a previously prepared salt of the acid and another salt containing the cation of the salt that it is desired to prepare. The salts produced in the foregoing or equivalent manner can be purified by recrystallization from suitable solvents or other applicable procedures which will be apparent to those skilled in the art.

The diesters to be employed in the process of the invention can be prepared according to known methods from hydrocarbon halides and tri-esters of phosphorous acid or from hydrocarbon halides and alkali salts of diesters of phosphorous acid. The corresponding dibasic phosphonic acids can be prepared in suitable cases by oxidation of primary phosphines, by hydrolysis of oxyhalophosphines, or according to other known generally applicable procedures. However, it has been found by us that when the desired dibasic phosphonic acid is one that contains a plurality of halogen atoms on the alpha carbon atom, particular reference being made to trichloromethanephosphonic acid, it is best prepared by pyrolyzing a lower dialkyl ester thereof by heating, preferably in the presence of acid and in the liquid phase while drawing off evolved gases. The non-catalytic pyrolysis of the di-n-alkyl esters preferably is carried out at substantially atmospheric pressures and at temperatures of from about 160° C. to about 350° C. Lower temperatures, down to about 100° C., can be used with the di-sec.-alkyl esters. The presence of acid in the mixture undergoing pyrolysis, such as an added strong non-volatile mineral acid, accelerates the pyrolysis reaction advantageously. The non-gaseous products of the pyrolysis can be worked up by dissolving in an inert organic solvent, such as petroleum ether, acetone, amyl propionate or benzene, and the dibasic phosphonic acid recovered from the solution by precipitation as an insoluble salt, such as the silver salt, and reconverted to the acid by treatment with a strong mineral acid, such as hydrochloric acid. The crude dibasic phosphonic acid can be purified by recrystallization, preferably from concentrated nitric or hydrochloric acid solution, by distillation in vacuo, or by other suitable means.

The following examples will serve to illustrate certain aspects of the invention. It is to be understood that the examples are presented with the intent of illustrating selected specific aspects of the invention and not with the intent of limiting the invention other than as it is defined in the hereto-appended claims. In the examples the parts are parts by weight unless specified otherwise.

*Example I.—Preparation of butyl trichloromethane phosphonic acid*

A. *Preparation of dibutyl trichloromethanephosphonate.*—To a glass vessel equipped with a water-cooled reflux column there are charged 4000 parts of carbon tetrachloride and 790 parts of tri-n-butyl phosphite. The carbon tetrachloride previously has been dried by allowing it to stand in contact with anhydrous potassium carbonate for one week and then distilling. The tributylphosphite is a freshly-distilled commercial product. The reaction mixture is heated at the boiling point for 68 hours under total reflux. At the end of this time 3 parts of powdered calcium carbonate are added to the kettle and unreacted carbon tetrachloride is distilled off under a pressure of 200 millimeters of mercury. The distillation then is continued under approximately 0.01 millimeter mercury pressure until the refractive index ($n$ 20/D) of the distillate coming over reaches 1.4590. The residue remaining in the still kettle then is distilled in a molecular still with the thimble heated at 56° C. There are recovered 722 parts of di-n-butyl trichloromethanephosphonate, corresponding to a yield of 79% of theory.

B. *Preparation of trichloromethanephosphonic acid.*—The di-n-butyl trichloromethanephosphonate prepared above is heated at 180° C. in a glass vessel open to the atmosphere. During the heating gas is evolved; a collected sample is found to be largely butylene. The heating is continued until the material in the kettle turns solid. The solid product is purified by extraction of soluble materials in carbon tetrachloride. The portion remaining after the extraction is found by analysis to be better than 90% pure trichloromethanephosphonic acid.

C. *Preparation of butyl trichloromethanephosphonic acid.*—Trichloromethanephosphonic acid prepared as above is dissolved in an equimolar amount of the di-butyl trichloromethanphosphonate and the mixture is heated at 100° C. for 32.5 hours. During the heating period small samples of the mixture are withdrawn at intervals, dissolved in a solvent mixture composed of 50% by volume benzene, 49.5% by volume isopropyl alcohol, and 0.5% by volume water, and titrated with a standardized approximately 0.1 N solutiton of KOH in isopropyl alcohol. The titration shows that as the heating progresses there occurs a gradual disappearance of the weak acid group of the trichloromethanephosphonic acid and an increase in the amount of strong acid present. At 32.5 hours the reaction is indicated to be complete. The crude reaction mixture thus prepared is extracted with a 10% solution of sodium hydroxide in water in an amount equivalent to the acid content of the mixture. The aqueous solution then is extracted with benzene and with ethyl ether and decolorized by treatment with activated carbon. The butyl trichloromethanephosphonic acid is sprung by addition of 6 moles hydrochloric acid to the aqueous solution and is extracted from the solution with diethyl ether. The diethyl ether is flashed from the extract and the residue is topped in a molecular still with the thimble at 36° C. The bottoms are found by potentiometric titration to contain 78% by weight of butyl trichloromethane phosphonic acid along with minor amounts of trichloromethanephosphonic acid and di-butyl trichloromethanephosphonate. The bottoms have the following composition: 23.5% carbon; 4.6% hydrogen; 11.9% phosphorus; 37.9% chlorine.

*Example II—Lithium butyl trichloromethanephosphonate*

The calculated amount of lithium hydroxide is added to an aqueous solution of butyl trichloromethanephosphonic acid and the mixture is boiled until a substantially clear solution results. The hot solution is filtered and evaporated to dryness, traces of water being removed by adding benzene and evaporating the benzene-salt slurry to dryness. The lithium butyl trichloromethanephosphonate is found to contain 2.54% of lithium compared to a theoretical content of 2.66%.

*Example III—Calcium butyl trichloromethanephosphonate*

To a solution of butyl trichloromethane phosphonic acid in water there is added ½ the molar amount of calcium carbonate. The solution is boiled until the base has passed into solution, is filtered hot and is evaporated to dryness. The neutral calcium salt remains as a solid residue. By employing equimolar amounts of butyl trichloromethanephosphonic acid and calcium hydroxide the basic calcium butyl trichloromethanephosphonate is obtained.

*Example IV—Zinc butyl trichloromethanephosphonate*

Zinc butyl trichloromethanephosphonate is prepared according to the procedure described in Example III substituting zinc carbonate for the calcium carbonate. The neutral zinc butyl trichloromethanephosphonate thus prepared is found to contain 11.2% zinc compared to a theoretrical value of 11.3%, and to contain 10.9% P (theory 10.8%).

*Example V—Aluminum butyl trichloromethanephosphonate*

The calculated amount of aluminum hydroxide is added to an aqueous solution of butyl trichloromethanephosphonic acid, a small amount of ethyl alcohol is added, and the mixture is boiled until the aluminum hydroxide dissolves. The hot mixture is filtered and evaporated to dryness. The aluminum butyl trichloromethanephosphonate is found to contain 2.90% aluminum compared to a theoretical content of 3.41%. The slightly low content of aluminum indicates that monobasic aluminum butyl trichloromethanephosphonate and possibly dibasic aluminum butyl trichloromethanephosphonate are present in addition to the neutral aluminum butyl trichloromethanephosphonate produced as the predominant product. The neutral salt has the probable formula:

$$Al[(C_4H_9)O_3PCCl_3]_3$$

Monobasic aluminum butyl trichloromethanephosphonate has the probable formula: $Al(OH)[(C_4H_9)O_3PCCl_3]_2$. The dibasic aluminum butyl trichloromethanephosphonate has the probable formula: $Al(OH)_2[(C_4H_9)O_3PCCl_3]$.

*Example VI—Allyl trichloromethanephosphonic acid*

Allyl trichloromethanephosphonic acid is prepared by adding to trichloromethanephosphonic acid prepared as in Example I an equimolar amount of diallyl trichloromethanephosphonate and heating the mixture at about 100° C. for 42 hours. The cooled mixture is extracted with an equivalent amount of sodium hydroxide in aqueous solution, acidifying the aqueous extract, extracting with benzene and distilling the benzene extract. The recovered allyl trichloromethanephosphonic acid is polymerized by adding about 1% by weight of benzoyl peroxide and heating at 75° C. Salts of the novel polymer, which has the probable structure

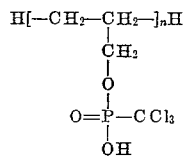

can be prepared by treatment with base or the polymer can be hydrolyzed with aqueous acid to produce a polyhydric alcohol.

One of the most noteworthy properties of the products of the invention, as hereinbefore noted, is that many of them have the characteristic of improving the properties of lubricants, particularly oleaginous lubricants of the petroleum or of the synthetic variety. Such products serve to greatly increase the ability of the lubricant to provide effective lubrication under conditions of extreme pressure on the oil film, and thereby render the lubricants better adapted to use under conditions where such extreme pressures are encountered.

The lubricants with which the products of the present invention can be employed are neutral liquid media that may be hydrocarbons or mixtures of hydrocarbons, such as any of the lubricating oils of petroleum origin. The liquid medium may be thickened with a soap to form a grease. Synthetic oils also are suitable, such as polymerized olefins, copolymers of alkylene glycols and alkylene oxides; organic esters, e. g., 2-ethylhexyl sebacate, allyl laurate, and polymers thereof; dioctyl phthalate, trioctyl phosphate, polyalkyl silicon polymers, and the like. The lubricants can be mixtures of synthetic lubricants and natural oils. The amount of the novel monobasic phosphonic acid or salt thereof that can be used depends upon the particular vehicle to which it is added and upon the intended use of the lubricant composition. Amounts varying from 0.01% to 20% or more can be used, a preferred range being from 0.01% to 10%.

The novel phosphonic acids of the invention can be used in conjunction with other additives, such as pour point depressors, viscosity improvers, anti-foaming agents, detergents, anti-oxidants, corrosion inhibitors, and the like.

Detergents which can be used in conjunction with the novel additives of the invention include oil-soluble salts of various bases with detergent-forming acids. Such salts include the alkali metal, Ca, Mg, Cu, Sr, Ba, Zn, Cd, Al, Sn, Pb, Cr, Mn, Fe, Ni, Co, and like salts, as well as organic salts, e. g., amine and ammonium salts, of detergent-forming acids such as fatty acids having from 10 to 30 carbon atoms, paraffin wax acids, various alkyl salicyclic acids, sulfonic acids such as may be produced by treatment of alkyl aryl hydrocarbons or high boiling petroleum oils with sulfuric acid, and arsonic and antimony acid, mono and diesters, and phosphoric acids.

Corrosion inhibitors which may be present include, for example, dicarboxylic acids of 16 or more carbon atoms, organic compounds containing acidic radicals and nitrile, nitro, nitroso groups in close proximity, such as alpha, cyano-stearic acid, and the like. Suitable anti-oxidants include alkyl phenols, amino phenols, amines, and other materials customarily used for the purpose.

The following tests show the effectiveness of representative products of the invention as extreme pressure additives for lubricating oils. The tests were conducted with a Four Ball Extreme Pressure Lubricating Tester similar in principle to the Boerlage apparatus described in the magazine Engineering, volume 136, July 13, 1933. This apparatus comprises four steel balls arranged in a pyramid formation. The top ball is rotated on a spindle against the bottom balls which are clamped in a stationary ball holder. The balls are immersed in the composition to be tested. Tests were run under conditions indicated in the following table and compared with outstanding known extreme pressure additives.

EXTREME PRESSURE TESTS ON LUBRICANTS CONTAINING ADDITIVES, USING FOUR BALL E. P. LUBRICANT TESTER

[Fixed conditions: 1 minute tests at 1,500 R. P. M.]

| Additive | Amount of Additive | | Base Oil | Initial Seizure Load, kg. |
|---|---|---|---|---|
| | Weight Percent | Percent P | | |
| none | | | A | 42–48 |
| butyl trichloromethane-phosphonic acid | 1.0 | 0.12 | A | 180–200 |
| none | | | B | 40–45 |
| calcium butyl trichloromethanephosphonate | 2.0 | 0.23 | B | 100–110 |
| Do | 4.0 | 0.45 | B | 100–110 |
| aluminum tris(butyl trichloromethanephosphonate) | 0.8 | 0.1 | B | 110–110 |
| zinc bis(butyl trichloromethanephosphonate) | 0.82 | 0.1 | B | 100–110 |
| lithium butyl trichloromethanephosphonate | 0.2 | 0.02 | B | 60–70 |
| Do | 0.71 | 0.08 | B | 60–70 |
| crude reaction mixture from Example I, Experiment C | 1.0 | 0.11 | C | 140–150 |

Base oils:
A—SAE 90 mineral lubricating oil.
B—Synthetic lubricant—di-2-ethylhexyl sebacate plus 15% of a polymeric ester of acrylic acid.
C—SAE 30 mineral lubricating oil.

We claim as our invention:

1. A compound of the class consisting of the phosphonic acids of the formula

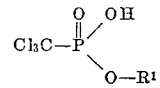

in which $R^1$ represents an esterifying alcohol radical, and the salts thereof with hydroxide-forming metals.

2. The phosphonic acids having the formula

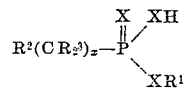

in which $R^1$ represents an esterifying alcohol radical, $R^2$ is a member of the class consisting of hydrogen, halogen, alkyl, and halogen-substituted alkyl, each $R^3$ is a member of the class consisting of hydrogen, alkyl, and halogen, at least the two $R^3$'s which are bonded to the carbon atom adjacent to the phosphorus atom representing halogen, $x$ is a whole positive number from 1 to 4 inclusive, and X is a non-metallic element of group VI–B of the periodic table of the elements.

3. The phosphonic acids according to claim 2 when the carbon atom adjacent to the phosphorus atom is substituted by at least two atoms of chlorine.

4. Alkyl trichloromethanephosphonic acid.

5. Alkenyl trichloromethanephosphonic acid.

6. Butyl trichloromethanephosphonic acid.
7. Allyl trichloromethanephosphonic acid.
8. The salt of a phosphonic acid defined in claim 2 with a hydroxide-forming metal.
9. The salt of a phosphonic acid defined in claim 1 with a polyvalent hydroxide-forming metal.
10. A process for the preparation of butyl trichloromethanephosphonic acid which comprises heating a mixture of dibutyl trichloromethanephosphonate and trichloromethanephosphonic acid at about 100° C. until there is an appreciable and substantial increase in the content of strong acid therein.
11. A process for the production of a monobasic phosphonic acid having a halogen-substituted aliphatic radical directly linked by a carbon-to-phosphorus bond to the phosphorus atom of a mono-esterified phosphono group which comprises heating a mixture of a diester of a phosphonic acid having a halogen-substituted aliphatic radical directly linked by a carbon-to-phosphorus bond to the phosphorus atom of the fully esterified phosphono group, and the corresponding phosphonic acid, until there has occurred an appreciable and substantial increase in the content of strong acid in the mixture.

References Cited in the file of this patent

UNITED STATES PATENTS

| | | |
|---|---|---|
| 2,174,019 | Sullivan | Sept. 26, 1939 |
| 2,346,155 | Denison et al. | Apr. 11, 1944 |
| 2,436,141 | Goebel | Feb. 17, 1948 |
| 2,495,799 | Woodstock | Jan. 31, 1950 |
| 2,573,568 | Harman et al. | Oct. 30, 1951 |
| 2,579,810 | Fields | Dec. 25, 1951 |

OTHER REFERENCES

Kamai: Compt. Rend. Acad. Sci., U.R.S.S., vol. 55, pp. 219–221 (1947), as abstracted in Chem. Abstracts, vol. 41, 5863–5864 (1947).